Figure 1:
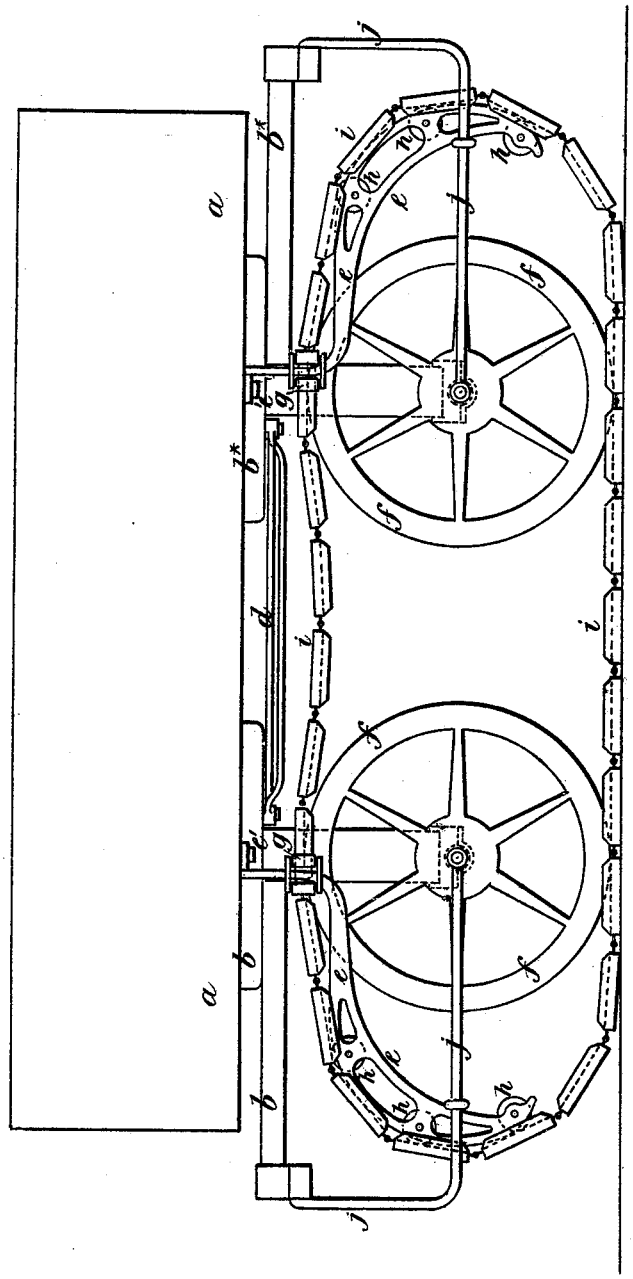

J. J. HALCOMBE.
Endless-Track Vehicles.

No. 219,938. Patented Sept. 23, 1879.

Attest:
Chas. J. Gooch
Walter Allen

Inventor
John J. Halcombe.
By Knight Bros
attys.

J. J. HALCOMBE.
Endless-Track Vehicles.
No. 219,938. Patented Sept. 23, 1879.
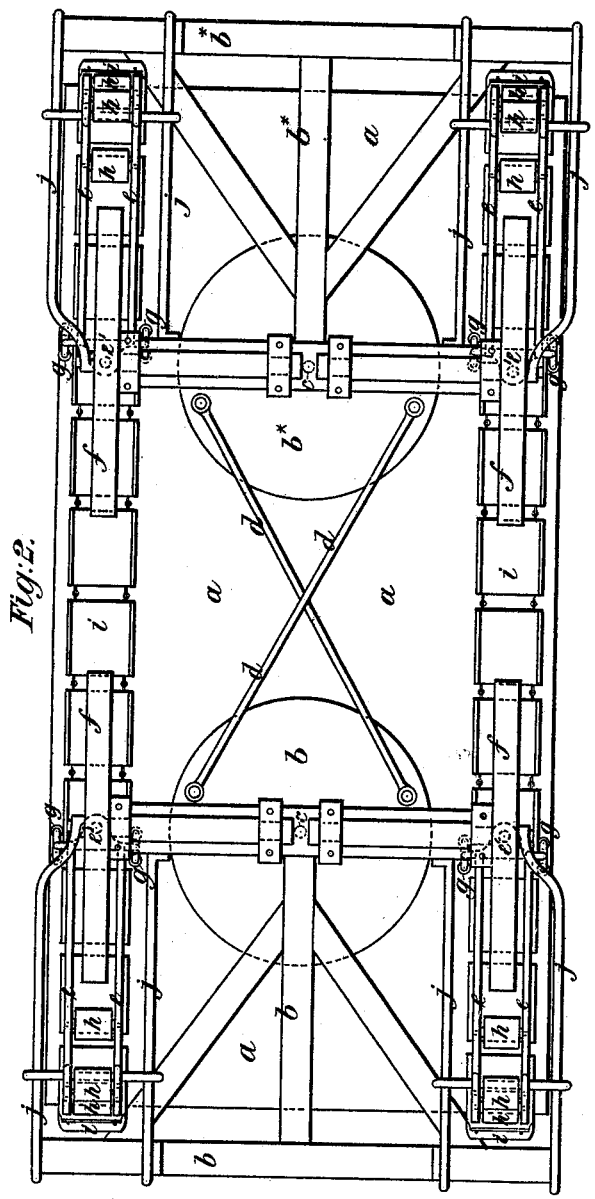
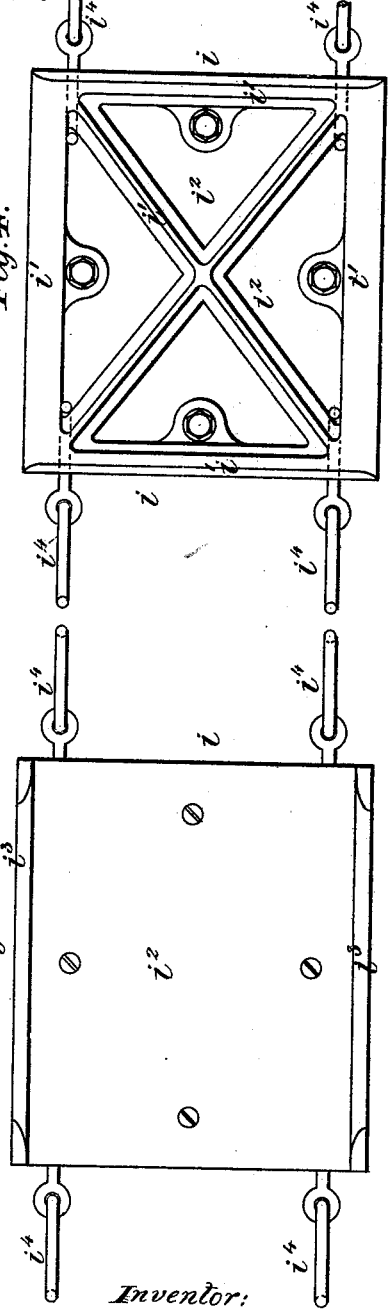
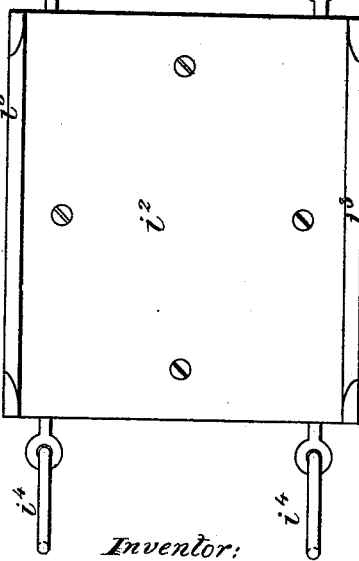

UNITED STATES PATENT OFFICE.

JOHN J. HALCOMBE, OF BALSHAM, COUNTY OF CAMBRIDGE, ENGLAND.

IMPROVEMENT IN ENDLESS-TRACK VEHICLES.

Specification forming part of Letters Patent No. 219,938, dated September 23, 1879; application filed May 8, 1879; patented in England, July 5, 1878.

*To all whom it may concern:*

Be it known that I, JOHN JOSEPH HALCOMBE, of Balsham, in the county of Cambridge, England, have invented new and useful Improvements in the Arrangement and Application to Vehicles of Movable or Traveling Tramways or Railways, and in the mode of working the same, which improvements are fully set forth in the following specification, reference being had to the accompanying drawings.

The apparatus, which may be applied to vehicles with two or more wheels, consists of a series of plates of convenient width and length jointed or linked to each other at their ends, so as to form an endless band or chain, the joints or links being of such a character that the plates may freely move in any direction. One of such bands or chains is carried on each side of the vehicle, and revolves round suitable drums at the extremities of the vehicle, and in such a position that the lower part, for the time being, of such chain shall always lie upon the ground, and, being in the same vertical line as the wheels of the vehicle, thus forms a continuous line or tramway, upon which the wheels may run. The drums on each side of the vehicle revolve upon studs or axes carried by frames capable of being moved horizontally by suitable connections from the axles or under carriages of the supporting-wheels, thus insuring the rails or tramways being always laid in the track of the leading wheels of the vehicle when moving in curves or turning corners.

Each pair of wheels, in the case of a four-wheeled vehicle, is carried by an under carriage, which turns upon an ordinary perch-bolt, the under carriages being suitably connected by cross-rods or levers, so that in turning corners or moving in other than straight lines the wheels on either side of the vehicle shall run in the same curve or part of a circle; and in order that my said invention may be more clearly understood and readily carried into effect, I will proceed, aided by the accompanying drawings, more fully to describe the same.

In the drawings, Figure 1 is a side view, and Fig. 2 is an under-side view, of a four-wheeled vehicle with my invention applied thereto. Fig. 3 is a plan, Fig. 4 is an under-side view, and Fig. 5 is an end view, of one of the plates and its connections of which the endless chains are formed. In Fig. 2 parts of the chains are removed, in order the clearer to show the wheels and guide-frames.

$a$ is the body of the vehicle. $b$, $b^\times$ are two under carriages, each of which is capable of turning upon an ordinary perch-bolt, $c$. These under carriages $b\,b^\times$ are connected together by cross-bars or levers $d$, so that as one under carriage is turned around its perch-bolt $c$ the other under carriage is also caused to turn in the same manner around its perch-bolt.

$e\,e$ are guide-frames, which are mounted on centers of motion $e'$ at each side of the vehicle, immediately over the center of each supporting-wheel $f$. These guide-frames $e$ are provided with studs or axes, on which are mounted guide drums or rollers $g$ and $h$, which control and facilitate the motion of the endless chains $i$.

The guide-frames $e$ are operated by arms or levers $j$, fixed to the under carriages to insure their being moved in the same path as the wheels, and thus lay the chains $i$ in position to insure the wheels running thereon. The endless chains $i$ run over the guide drums or rollers $h$, and rest on the upper parts of the supporting-wheels $f$, which give a forward motion to such chains $i$, thereby greatly facilitating the action of the apparatus.

The endless chains $i$ are preferably formed, as shown at Figs. 3, 4, and 5, of cast plates or frames $i^1$, to which a steel plate or face, $i^2$, for the wheels to run on is fixed by screws or otherwise. These plates are formed with side flanges $i^3$, and are connected together by links $i^4$, which pass freely through holes formed in the plates, and are capable of moving to and fro and slightly sidewise in such holes, to enable the endless chains to accommodate themselves to the varying path of the wheels. The flanges $i^3$ serve to prevent the wheels $f$ running off the endless chains, and also to keep such chains in position when passing over the guide-rollers $h$. The links $i^4$ are each formed with an eye at one end, while the other end is turned up or enlarged to prevent their coming out of the plates $i^1$.

In the case of a two-wheeled vehicle, the guide-frames $e$ in front and at the back of each wheel are, according to one arrangement, rigidly connected together, and are mounted upon the same axis or center of motion, and are operated by arms or levers $j$ in a similar manner to that hereinbefore described; or the guide-frames $e$ may be rigidly connected to the under carriage, so as to move therewith.

I have not thought it necessary to represent in the drawings a two-wheeled vehicle with movable or traveling apparatus applied thereto as above described, as by the description herein given such will be readily understood.

Having thus described the nature of my said invention and the mode in which I carry the same into effect, I would have it understood that I do not claim the employment, generally considered, of endless chains or tramways carried by vehicles, and caused by the forward motion of the vehicle to lie on the ground in position for the supporting-wheels to run thereon when such are not combined with means to facilitate the running of the vehicle in other than straight lines; but

What I do claim is—

1. The bracket $e$, mounted on centers $e'$ at each side of a vehicle, and depending downward in front of the wheels, vertically and horizontally rotating rollers $g$ $h$, and arms or levers $j$, secured to the under carriage and operating the guide-frame or brackets $e$, substantially as set forth.

2. The endless-chain tramways or railways $i$, having plates or frames $i^1$, steel face $i^2$, side flanges $i^3$, and links $i^4$.

3. The under carriages $b$ $b^x$, connected together by cross-bars or levers $d$, and adapted to turn on perch-bolt $c$, and bracket $e$, secured at one end to the carriage-body and depending downwardly to a short distance below the center, and provided at intervals with studs or axes, on which are mounted rollers $g$ $h$, for facilitating and controlling the movement of the chain tramway $i$, substantially as set forth.

JOHN JOSEPH HALCOMBE.

Witnesses:
B. J. B. MILLS,
C. M. WHITE,
 *Both of 23 Southampton Buildings, London, England.*